United States Patent Office 2,967,171
Patented Jan. 3, 1961

2,967,171

REACTION OF ORGANOHYDROGENOSILICON COMPOUNDS WITH HYDROXY COMPOUNDS

Garrett H. Barnes, Jr., Pittsburgh, Pa., and Gerald W. Schweitzer, Miles City, Mont., assignors to Dow Corning Corporation, Midland, Mich., a corporation of Michigan No Drawing. Filed June 14, 1957, Ser. No. 665,645

7 Claims. (Cl. 260—46.5)

The present invention relates to an improved method for the production of certain hydrocarbonoxy-, halohydrocarbonoxy-, acyloxy-, or organosilylalkoxy subsituted organosilicon compounds.

It is known that certain organosilicon compounds containing silicon-bonded hydrogen atoms can be made to react with hydroxy compounds such as alcohols, phenols, or carboxylic acids, in the presence of "ansolvo acids" such as zinc chloride, magnesium chloride, or boron trifluoride. The reaction proceeds with the evolution of gaseous hydrogen and the formation of the corresponding alkoxy etc. derivatives, the alkoxy etc. groups being attached to silicon at the site of the displaced silicon-bonded hydrogen. Relatively large amounts of the ansolvo acid catalyst (e.g. about 6 to 25 percent by weight based on the weight of the organosilicon compound) have been recommended for the reaction. The use of alkaline catalysts such as NaOH, KOH, and their alcoholates has also been advocated for the same type of reaction. The latter ecatalysts cannot be used where silicon-bonded halogen atoms are present, however, because the catalyst itself is then reactive toward the silicon compound.

It is an object of the present invention to provide an improved method for carrying out the general type of reaction described above by the use of an improved catalyst for the reaction. Other objects and advantages will be apparent from the following description.

It has been found that chloroplatinic acid, even in almost negligible amounts, is an extremely potent catalyst for the type of reaction in question. This catalyst not only meets the inherent objectionable characteristics of the above-discussed catalysts, but also greatly extends the type of reactants and reaction conditions which can be used. Thus the present invention is particularly concerned with the method which comprises reacting (1) a silicon compound containing at least one hydrogen atom attached to at least one silicon atom per molecule, with (2) an hydroxy compound selected from the group consisting of (A) compounds of the formula ROH where R is selected from the group consisting of acyl radicals free of aliphatic unsaturation, and alkyl, aryl, alkaryl, aralkyl, haloalkyl and haloaryl radicls, (B) compounds of the formula

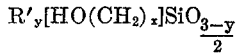

where $x$ and $y$ are integers of from 1 to 3 inclusive and R' represents monovalent hydrocarbon radicals free of aliphatic unsaturation, (C) polyhydroxy alcohols free of aliphatic unsaturation and selected from the group consisting of dihydroxy, trihydroxy, and tetrahydroxy alcohols, (D) dicarboxylic acids free of aliphatic unsaturation, and (E) an alkyd resin containing free residual alcoholic hydroxyl groups, said resin being free of aliphatic unsaturation, by contacting (1) and (2) in liquid phase in the presence of chloroplatinic acid.

The nature of the reaction in simplified form can be illustrated by the general equation:

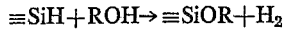

Where more than one hydrogen is present on one silicon atom, each can be replaced in the same manner so long as sufficient of the hydroxy compound is present.

Any silicon compound containing at least one H atom linked to silicon per molecule can be used in this invention. Thus this particular reactant can be a monomer, a polymer, a copolymer, or any mixture of these. The reactant can be entirely inorganic, such as $HSiCl_3$ and $H_2SiBr_2$, or it can contain organic substituents, e.g. $R''SiH_2Cl$ and $R''_3SiH$. Any organic substituents present are not necessarily linked directly to the Si by Si-C bonds, thus compounds such as $HSi(OR')_3$, $$HSi(OR')Cl_2,$$

and $R''HSi(OOCR')_2$ are suitable.

When a polmeric silicon compound is employed, it can be, e.g., a polysilane, polysiloxane, polysilcarbane (characterized, for example, by a $SiCH_2Si$ or $SiC_6H_4Si$ type of structure), a silazane (a SiNSi type of structure) or any copolymers containing any such polymeric units. The term "polymeric" as used above is intended to include both dimers and copolymers.

Examples of suitable polymers include $Cl_2HSiSiHCl_2$, $R''_2HSiSiBr_3$, $R''_2HSiOSiR''_2H$, $(R''HSiO)_a$ where $a$ is 3 or more, $R''_3SiCH_2CH_2SiHCl_2$, $R''_3SiC_6H_4SiH_2OR$, $R''SiO(RHSiO)_dSiR''_3$ where $d$ is any integer, and copolymeric siloxanes containing any one or more of the units $R''_3SiO_{.5}$, $R''_2SiO$, $R''SiO_{1.5}$ or $SiO_2$ along with at least one unit per molecule of the formula $R''HSiO$, $R''_2HSiO_{.5}$, $HSiO_{1.5}$, $H_2SiO$ or $R''H_2SiO_{.5}$.

The preferred monomeric silicon reactants containing silicon-bonded hydrogen are those of the formula

where X represents halogen atoms and/or alkoxy radicals and/or aryloxy radicals, $q$ is from 0 to 3 inclusive and $r$ is from 1 to 3 inclusive, the sum of $q+r$ being not greater than 4. Likewise the preferred polymeric or copolymeric reactants are those siloxanes obtained by the hydrolysis of this monomer, i.e. siloxanes containing polymeric units of the formula

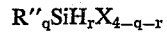

where $q+r$ is not greater than 3.

In all of the above reactants, R'' can be any organic radical, and can represent the same or different radicals attached to either one silicon atom or to different silicon atoms in the molecule. Preferably each R'' is a monovalent hydrocarbon radical free of aliphatic unsaturation, preferred species being alkyl such as methyl, ethyl, and octadecyl; aryl such as phenyl and xenyl; aralkyl such as benzyl; alkaryl such as tolyl; and cycloaliphatic such as cyclohexyl. This preference is based upon the availability and ease of preparation of such reactants, as well as upon their inertness in the reaction in question. Many substituted derivatives of the listed radicals are equally inert, and these are of course equally suitable as far as the reaction itself is concerned, and thus can be present in the silicon reactant if desired. Examples of the latter are halogenated monovalent hydrocarbon radicals, e.g. chlorophenyl, dibromophenyl, $\alpha,\alpha,\alpha$-trifluorotolyl, and 1,1,1-trifluoropropyl radicals.

The stated preference that the R'' radicals be free of aliphatic unsaturation is to avoid the competing reaction which otherwise can take place in the presence of chloroplatinic acid. For example, a compound such as

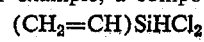

can undergo an addition reaction with itself under these conditions to produce SiCH₂CH₂Si type compounds. For this reason it is preferred to avoid silicon reactants containing silicon-bonded vinyl, allyl, or cyclohexenyl radicals and the like. It is to be understood, however, that the reaction of this invention will take place in spite of the presence of such unsaturated radicals, albeit on a competitive basis. In fact it is generally found that in the presence of the defined hydroxy compounds, the reaction of this invention is the predominant one even when radicals having aliphatic unsaturation are present.

The most preferred of the silicon reactants (1) are those in which all of the organic radicals present are methyl and/or phenyl radicals. In the preferred monomeric silanes, when X is a halogen atom chlorine and bromine are preferred. When X is alkoxy it preferably contains from 1 to 12 inclusive carbon atoms, and phenoxy is the most preferred of the aryloxy radicals. In view of the stated preferences, the most suitable monomeric reactants can be defined as being of the formula $$(C_6H_5)_b(CH_3)_cHSiCl_{3-b-c}$$

where $b$ and $c$ are integers of from 0 to 3 inclusive, the sum of $b+c$ being from 1 to 3 inclusive. Likewise the most suitable of the polymeric or copolymeric silicon reactants are siloxanes containing the comparable siloxane units having the formula $$(C_6H_5)_b(CH_3)_cHSiO_{\frac{3-b-c}{2}}$$

where $b$ and $c$ are as above defined. If any additional units are present in such a copolymer, i.e. units which do not contain silicon-bonded hydrogen, it is preferred that they be of the formula $$(C_6H_5)_b(CH_3)_cSiO_{\frac{4-b-c}{2}}$$

where $b$, $c$, and the sum of $b+c$ are as above defined.

The monomeric, polymeric, and copolymeric organosilicon reactants (1) discussed above have been amply described in the literature.

The hydroxy compounds employed as reactant (2) herein can be classified into five general groups. First are the compounds of the formula ROH. These include the alcohols where R is alkyl such as methyl, ethyl, propyl, butyl, t-butyl, and octadecyl; or aralkyl such as benzyl; or haloalkyl such as alpha chloroethyl, beta bromoethyl, and 1,1,1-trifluoropropyl; and the phenols where R is aryl such as phenyl and xenyl; or alkaryl such as tolyl; or haloaryl such as bromophenyl, dichlorophenyl and α,α,α-trifluorotolyl. This first group also includes the monocarboxylic acids where R is an acyl radical, e.g. acetic, propionic, valeric, palmitic, stearic, chloroacetic, benzoic, salicyclic, glycollic and lactic acids. Of course for more clear-cut reactions, the hydroxy acids such as the latter three are preferably avoided because reaction may take place through the hydroxy and/or the carboxy group, thus leading to a mixed product.

The ROH compounds are all preferably free of aliphatic unsaturation. This is not because compounds such as allyl alcohol and acrylic or methacrylic acid etc. fail to undergo the reaction of this invention—on the contrary, such compounds do form the expected allyloxy-, acryloxy- or methacryloxy-substituted derivatives and the like in a predominant proportion. The preference is based upon the usual desire to avoid the competing addition reaction which takes place in the presence of chloroplatinic acid between ≡SiH and a compound having aliphatic unsaturation. This competing reaction is a well-known type of reaction (known, that is, where other catalysts are used), and takes the general form:

$$\equiv SiH + CH_2 = CHR'' \rightarrow \equiv SiCH_2CH_2R''$$

It can be seen that where, e.g., allyl alcohol or acrylic acid is employed, the corresponding ≡SiOCH₂CH=CH₂ or ≡SiOOCCH=CH₂ derivatives are obtained. Then if any unreacted ≡SiH compounds are present, as where such are used in excess or are present in excess at the moment, the corresponding $$\equiv SiOCH_2CH_2CH_2Si\equiv$$

or $$\equiv SiOOCCH_2CH_2Si\equiv$$

type of compounds can be produced.

The second type of hydroxy compound which can be used in this invention is one having the unit formula $$R'_y[HO(CH_2)_x]SiO_{\frac{3-y}{2}}$$

where $x$ and $y$ are integers of from 1 to 3 inclusive and R' represents monovalent hydrocarbon radicals free of aliphatic unsaturation. Where more than one R' radical is attached to one silicon atom, it can represent the same or different radicals. Examples of suitable R' radicals include all of the preferred R" radicals illustrated above. The most preferred compounds are those wherein R' is methyl and/or phenyl. This second type of hydroxy compound is known, and the preparation thereof has been described, for example, in U.S. Patents 2,527,591; 2,582,569; 2,635,109; and 2,629,727.

The third class of hydroxy compounds suitable for the reaction in question are polyhydroxy alcohols free of aliphatic unsaturation. These include the di-, tri-, and tetrahydroxy alcohols, e.g. glycols such as ethylene, propylene, and tetramethylene glycol; glycerine, erythritol, and pentaerythritol. Each of the hydroxy groups in the polyhydroxy alcohol may react with ≡SiH while any of the latter is present, hence products take the form of $$\equiv SiOCH_2CH_2OSi\equiv$$

and the like, as well as the form of ≡SiOCH₂CH₂OH. Unreacted hydroxy groups as are present in the latter illustration can be reacted with dicarboxylic acids to form high molecular weight esters, and where glycerine or an erythritol has been used in the original reaction, to form alkyd type resins.

The fourth type of hydroxy compound used as a reactant herein is represented by the dicarboxylic acids. These include the aliphatics such as malonic, succinic, adipic, and sebacic acids, as well as the aromatics such as phthalic, isophthalic, and terephthalic acids. For the same reasons as previously stated, it is preferred that these acid reactants be free of aliphatic unsaturation.

The last type of hydroxy substituted reactant used herein is an alkyd resin containing free residual alcoholic hydroxyl groups. As is well known, such resins are prepared by the reaction of one or more polyhydric alcohols with one or more polycarboxylic acids. Commercially, such resins usually are prepared from alcohols such as ethylene glycol, propylene glycol, glycerine, and/or pentaerythritol, and acids such as malonic, succinic, adipic, phthalic, isophthalic, and terephthalic acids. These alkyd resins can be "oil-modified" if desired, but it is preferred that any such modification be of the type which does not incorporate aliphatic unsaturation into the resin. Since this reactant must contain free residual hydroxyl groups, it is obvious that the polyhydric alcohol should be used in excess of the acid groups so that unesterified OH groups will be present in the resin product. As long as the required residual hydroxyl groups are present, the alkyd resin also can be of the "siliconmodified" type if desired. The latter type has been amply described in the literature.

The chloroplatinic acid used herein can be used in its usual commercial form, i.e. as the hexahydrate $H_2PtCl_6 \cdot 6H_2O$. The dehydrated acid is also effective, but no advantage seems to come from the dehydration and the unnecessary step is preferably avoided. In general the catalyst is used in an amount of from about $1 \times 10^{-7}$ to about $1 \times 10^{-3}$ mole per molar equivalent of silicon-bonded hydrogen. Smaller amounts are effective but often lead to a slower reaction, and usually there is no advantage to be gained from the use of larger amounts. To facilitate handling such small amounts of catalyst, it is preferable to employ a solution of the catalyst. A great number of the alcohols are themselves good solvents for the catalyst, and hence it is often possible to use a solvent identical to the alcohol which is to be a reactant. Even if this is not possible, however, such a small relative amount of the catalyst solution is introduced into the system that any contamination of the product resulting from the reaction of an alcoholic solvent is negligible.

Many of the reactants defined herein will react at a satisfactory speed in the presence of chloroplatinic acid at ordinary room temperature. The slower reactions can be expedited by increasing the temperature up to any point short of the decomposition temperature of the reactants, but temperatures in the region of 25° to 150° C. are generally adequate. The reaction is carried out in the liquid phase, and for volatile reactants or when higher temperatures are desirable, any pressure necessary to maintain a liquid phase can be used. Ordinarily, however, a temperature above the reflux temperature of any of the reactants will not be necessary and superatmospheric pressures can be avoided.

If desired, inert solvents such as benzene, toluene, xylene, saturated petroleum hydrocarbons and the like can be present during the reaction. Such solvents may in fact be desirable to maintain the required liquid phase where the reactants are high molecular weight materials such as, e.g., the alkyd resins. Some solvents have other beneficial effects on the system. For example, when isooctane is present in an amount equal to or greater than the amount of alcoholic reactants present, the rate of reaction is surprisingly increased. It is thought that this phenomenon may be correlated to the low dielectric constant of isooctane.

A particularly surprising aspect of this invention is found in the fact that the hydroxy compounds have been reacted preferentially with silicon-bonded hydrogen even in the presence of silicon-bonded halogen. The reactivity of an alcohol with, e.g., an organochlorosilane to produce the corresponding organoalkoxysilane and HCl is well known, and under ordinary circumstances any silicon-bonded hydrogen present is relatively unaffected. In the presence of chloroplatinic acid, however, one can react an alcohol with a hydrogenohalosilane and replace only the hydrogen with alkoxy groups, leaving the silicon-bonded halogen atoms unreacted so long as the alcohol is not present in excess. A reaction of this type seems to have been completely unknown hitherto. Thus this invention provides a method for the production of alkoxyhalosilanes which is readily controlled in regard to the number of alkoxy groups present on any particular silicon atom. When such silanes are hydrolyzed to produce the corresponding siloxanes, the halogen atoms are more reactive than the alkoxy groups, hence it is easy to produce alkoxy substituted organosiloxanes. The latter, as is known, are useful in the production of silicone-modified alkyd resins.

The reactants herein can be brought together in any ratio whatsoever, the chosen ratio depending upon the type of product sought. Thus when a polyfunctional alcohol or acid is used, products containing residual unreacted hydroxy or carboxylic groups can be prepared by having a relative molar excess present as compared to the silicon-bonded hydrogen. Conversely, when the SiH groups are present in excess, products containing unreacted SiH can be obtained. Ordinarily a ratio is employed which provides from 0.5 to 2 of the reactive groups per silicon-bonded hydrogen atom.

The products containing residual hydroxy groups can be reacted with dibasic acids to produce silicone-alkyd resins. Likewise products containing residual carboxylic groups can be reacted with polyhydric alcohols to produce silicone-alkyd resins. Also, of course, the products obtained by reacting an alkyd resin containing residual hydroxy groups with the SiH type reactants are themselves silicone-alkyd resins. The uses of such silicone-alkyd resins as magnet wire enamel and the like are well known.

The following examples are illustrative only. The symbols Me, Et, Bu, and Ph have been used to represent methyl, ethyl, butyl, and phenyl radicals respectively.

*Example 1*

The compound PhMe$_2$SiH was mixed with one of the following alcohols or phenols in a molar ratio of about 1:100, and H$_2$PtCl$_6$·6H$_2$O was added thereto in an amount sufficient to provide about $1 \times 10^{-4}$ mole per mole of the silane. The large excess of alcohol was employed because the reactions were being conducted to determine the rate of reaction of the various alcohols, as measured by the rate of evolution of hydrogen gas. In order to avoid any other variables, the H$_2$PtCl$_6$·6H$_2$O was introduced as a solution in the particular alcohol being studied. In each case the reaction both began and continued almost quantitatively to completion at room temperature. The alcohols employed were as follows, in descending order of reactivity: benzyl alcohol, butanol, hexanol, (CH$_3$)$_3$SiCH$_2$OH, ethanol, methanol, p-chlorophenol, isopropanol, t-butanol. Considering each alcohol, etc., as having the formula ROH, the corresponding product of the formula PhMe$_2$SiOR was obtained in each instance.

*Example 2*

A large excess of butanol was mixed with one of various organosilicon compounds as listed below. A solution of H$_2$PtCl$_6$·6H$_2$O in butanol was added to each mixture in an amount sufficient to provide about $1 \times 10^{-4}$ mole per mole of the silane. The reactions proceeded to completion at room temperature. By the rate of evolution of hydrogen the order of activity was found to be as follows, in descending order:

| Reactant | Product |
| --- | --- |
| PhSiH$_3$ | PhSiH$_2$(OBu) |
| PhSiH$_3$ | PhSiH(OBu)$_2$ |
| PhMe$_2$SiH | PhMe$_2$Si(OBu) |
| EtMe$_2$SiOSiMe$_2$H | EtMe$_2$SiOSiMe$_2$(OBu) |
| Ph$_2$MeSiH | Ph$_2$MeSi(OBu) |
| PhSiH$_3$ | PhSi(OBu)$_3$ |
| n-C$_5$H$_{11}$SiH$_3$ | n-C$_5$H$_{11}$Si(OBu)$_3$ |

*Example 3*

An excess of acetic acid was mixed with PhMe$_2$SiH in the presence of $1 \times 10^{-4}$ mole of chloroplatinic acid per mole of the silane. Hydrogen was evolved at room temperature, and the product PhMe$_2$SiOOCCH$_3$ was obtained. When malonic or sebacic acids are reacted in a comparable manner, the products are

PhMe$_2$SiOOCCH$_2$COOH and

PhMe$_2$SiOOCCH$_2$COOSiPhMe$_2$ in the former case, and

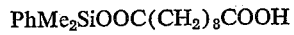

PhMe$_2$SiOOC(CH$_2$)$_8$COOH and

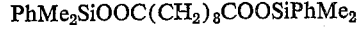

PhMe$_2$SiOOC(CH$_2$)$_8$COOSiPhMe$_2$ in the latter. In like manner, the use of phthalic, isophthalic, or terephthalic acids results in the production of the corresponding isomers of the formulas

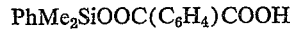

PhMe$_2$SiOOC(C$_6$H$_4$)COOH and

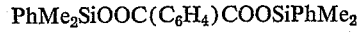

PhMe$_2$SiOOC(C$_6$H$_4$)COOSiPhMe$_2$

*Example 4*

A mixture of (Me$_2$HSi)$_2$O and isopropanol was prepared in the molar ratio of 1:2. Sufficient of a 0.1 molar solution of chloroplatinic acid in isopropanol was added to provide $3 \times 10^{-5}$ mole of the acid per mole of the alcohol. The reaction at room temperature was vigorous, and distillation of the product gave the compounds $Me_2HSiOSiMe_2(OCHMe_2)$ and $O[SiMe_2(OCHMe_2)]_2$. When the reaction is carried out with $(PhMeHSi)_2O$ in place of the above siloxane, the comparable derivatives containing one phenyl and one methyl radical on each silicon atom are obtained.

*Example 5*

A polymeric siloxane fluid of the general formula $Me_3SiO(MeHSiO)_nSiMe_3$ was mixed with sufficient ethylene glycol to provide two of the alcoholic hydroxy groups per silicon-bonded hydrogen. Hydrogen evolution at room temperature began immediately upon the addition of chloroplatinic acid to the mixture, resulting in the production of a polymer containing —$OCH_2CH_2OH$ groups bonded to silicon.

*Example 6*

When glycerine or pentaerythritol is mixed with chloroplatinic acid and $(MeHSiO)_4$ is added thereto, hydrogen is evolved and the corresponding glycerides or "pentaerythritides" are formed through the reaction of one of the alcoholic OH groups with the silicon-bonded hydrogen.

*Example 7*

Chloroplatinic acid was added to PhMeHSiCl in the ratio of $1 \times 10^{-3}$ mole of the acid per mole of the silane. Butanol was slowly added thereto in a total amount of one mole per mole of the silane. Hydrogen was evolved throughout the addition, and the product was found to be PhMeSi(OBu)Cl.

*Example 8*

When $MeHSi(OEt)_2$ is reacted with chloroethanol or tribromoethanol in the presence of chloroplatinic acid by the method of Example 7, the compounds $$MeSi(OEt)_2OCH_2CH_2Cl$$

or $$MeSi(OEt)_2OCH_2CBr_3$$

are produced. Using $MeHSi(OPh)_2$ as the silane leads to the comparable phenoxy derivatives.

*Example 9*

A viscous polymer having the unit formula $$[(HOCH_2)MeSiO]$$

was prepared by the method of U.S. Patent No. 2,527,591. This was mixed with a toluene solution of a copolymer containing equimolar amounts of units of the formula $PhSiO_{2.5}$, $MeSiO_{1.5}$, and MeHSiO, in a ratio sufficient to provide one —$CH_2OH$ radical per silicon-bonded hydrogen. When chloroplatinic acid is added and the mixture is warmed, hydrogen is evolved and a resinous copolymer is produced. When ethanol is used in this reaction in place of the hydroxymethylmethylsiloxane, a copolymer containing silicon-bonded ethoxy groups is produced.

*Example 10*

Phthalic anhydride (2 moles) and glycerine (2 moles) were mixed and heated to 180° C. to produce a glyceryl phthalate containing residual hydroxy groups. This "alkyd" type resin, when mixed with 2 moles of either $PhMe_2SiH$ or $Me_3SiOSiMe_2H$ and warmed in the presence of $2 \times 10^{-3}$ mole chloroplatinic acid, releases hydrogen and forms the corresponding "silico-alkyd" resin.

That which is claimed is:

1. The method which comprises reacting (1) a silicon compound containing at least one hydrogen atom attached to at least one silicon atom per molecule, with (2) an hydroxy compound selected from the group consisting of (A) compounds of the formula ROH where R is selected from the group consisting of carboxylic acyl radicals free of aliphatic unsaturation, and alkyl, aryl, alkaryl, aralkyl, haloalkyl, and haloaryl radicals, (B) compounds of the formula $$R'_y[HO(CH_2)_x]SiO_{\frac{3-y}{2}}$$

where $x$ and $y$ are integers of from 1 to 3 inclusive and R' represents monovalent hydrocarbon radicals free of aliphatic unsaturation, (C) polyhydroxy alcohols free of aliphatic unsaturation and selected from the group consisting of dihydroxy, trihydroxy, and tetrahydroxy alcohols, (D) dicarboxylic acids free of aliphatc unsaturation, and (E) an alkyd resin containing free residual alcoholic hydroxyl groups, said resin being free of aliphatic unsaturation, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

2. The method of claim 1 wherein the concentration of chloroplatinic acid is at least $1 \times 10^{-7}$ mole per molar equivalent of silicon-bonded hydrogen.

3. The method which comprises reacting (1) a compound of the formula $R''_qSiH_rX_{4-q-r}$, where R'' represents monovalent hydrocarbon radicals free of aliphatic unsaturation, X is selected from the group consisting of halogen atoms, alkoxy radicals, and aryloxy radicals, $q$ is an integer of from 0 to 3 inclusive, and $r$ is an integer of from 1 to 3 inclusive, the sum of $q+r$ being not greater than 4, with (2) an hydroxy compound selected from the group consisting of (A) compounds of the formula ROH where R is selected from the group consisting of carboxylic acyl radicals free of aliphatic unsaturation, and alkyl, aryl, alkaryl, aralkyl, haloalkyl, and haloaryl radicals, (B) compounds of the formula $$R'_y[HO(CH_2)_x]SiO_{\frac{3-y}{2}}$$

where $x$ and $y$ are integers of from 1 to 3 inclusive and R' represents monovalent hydrocarbon radicals free of aliphatic unsaturation, (C) polyhydroxy alcohols free of aliphatic unsaturation and selected from the group consisting of dihydroxy, trihydroxy, and tetrahydroxy alcohols, (D) dicarboxylic acids free of aliphatic unsaturation, and (E) an alkyd resin containing free residual alcoholic hydroxyl groups, said resin being free of aliphatic unsaturation, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

4. The method which comprises reacting (1) a compound of the formula $(C_6H_5)_b(CH_3)_cHSiCl_{3-b-c}$ where $b$ and $c$ are integers of from 0 to 3 inclusive, the sum of $b+c$ being from 1 to 3 inclusive, with (2) an alcohol of the formula ROH where R is an alkyl radical, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

5. The method which comprises reacting (1) an organosiloxane containing units of the formula $$(C_6H_5)_b(CH_3)_cHSiO_{\frac{3-b-c}{2}}$$

where $b$ and $c$ are integers of from 0 to 3 inclusive, the sum of $b+c$ being from 1 to 3 inclusive, any other units present in the organosiloxane being of the formula $$(C_6H_5)_b(CH_3)_cSiO_{\frac{4-b-c}{2}}$$

where $b$, $c$, and the sum of $b+c$ are as above defined, with (2) an alcohol of the formula ROH where R is an alkyl radical, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

6. The method which comprises reacting (1) a silicon compound containing at least one hydrogen atom attached to atl east one silicon atom per molecule, with (2) a compound of the formula ROH where R is selected from the group consisting of carboxylic acyl radicals free of aliphatic unsaturation, and alkyl, aryl, alkaryl, aralkyl, haloalkyl, and haloaryl radicals, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

7. The method which comprises reacting (1) a silicon compound containing at least one hydrogen atom attached to at least one silicon atom per molecule, with (2) a compound of the formula $$R'_y[HO(CH_2)_x]SiO_{\frac{3-y}{2}}$$

where $x$ and $y$ are integers from 1 to 3 inclusive and R' represents monovalent hydrocarbon radicals free of aliphatic unsaturation, by contacting (1) and (2) as the sole reactants in liquid phase in the presence of chloroplatinic acid and in a proportion such that there is a ratio of at least 0.5 hydroxy group in (2) per silicon-bonded hydrogen atom in (1).

No references cited.

UNITED STATES PATENT OFFICE
CERTIFICATION OF CORRECTION

Patent No. 2,967,171 January 3, 1961

Garrett H. Barnes, Jr., et al.

It is hereby certified that error appears in the above numbered patent requiring correction and that the said Letters Patent should read as corrected below.

Column 2, line 20, for "polmeric" read -- polymeric --; line 30, for "R″SiO(RHSiO)$_d$SiR″$_3$" read -- R″$_3$SiO(RHSiO)$_d$SiR″$_3$ --; column 7, line 54, for "PhSiO$_{2.5}$" read -- PhSiO$_{1.5}$ --.

Signed and sealed this 20th day of June 1961.

(SEAL)
Attest:

ERNEST W. SWIDER
Attesting Officer

DAVID L. LADD
Commissioner of Patents